US008799506B2

(12) United States Patent
Gupta et al.

(10) Patent No.: US 8,799,506 B2
(45) Date of Patent: Aug. 5, 2014

(54) SYSTEM USING PERSONALIZED VALUES TO OPTIMIZE CONTENT PROVIDED TO USER

(75) Inventors: Puneet Gupta, Bangalore (IN); Karthik Gopalakrishnan Vinmani, Bangalore (IN); Venkat Kumar Sivaramamurthy, Bangalore (IN); Akshay Darbari, Allahabad (IN)

(73) Assignee: Infosys Limited, Bangalore (IN)

( * ) Notice: Subject to any disclaimer, the term of this patent is extended or adjusted under 35 U.S.C. 154(b) by 179 days.

(21) Appl. No.: 13/562,660

(22) Filed: Jul. 31, 2012

(65) Prior Publication Data

US 2013/0036194 A1     Feb. 7, 2013

(30) Foreign Application Priority Data

Aug. 1, 2011 (IN) .......................... 2637/CHE/2011

(51) Int. Cl.
*G06F 15/16* (2006.01)
(52) U.S. Cl.
USPC ............ 709/237; 709/221; 709/224; 709/228
(58) Field of Classification Search
USPC ............... 709/237, 221, 224, 228; 348/14.01; 700/94; 705/26; 702/19; 600/300; 345/7
See application file for complete search history.

(56) References Cited

U.S. PATENT DOCUMENTS

| 2003/0195398 | A1* | 10/2003 | Suzuki et al. ................. 600/300 |
| 2008/0158096 | A1* | 7/2008 | Breed ................................ 345/7 |
| 2009/0030619 | A1* | 1/2009 | Kameyama ..................... 702/19 |
| 2010/0063892 | A1* | 3/2010 | Keronen et al. ................. 705/26 |
| 2010/0241256 | A1* | 9/2010 | Goldstein et al. ............... 700/94 |
| 2012/0069131 | A1* | 3/2012 | Abelow ..................... 348/14.01 |

* cited by examiner

*Primary Examiner* — Le H Luu
(74) *Attorney, Agent, or Firm* — LeClairRyan, a Professional Corporation

(57) ABSTRACT

A method, non-transitory computer readable medium, and apparatus that obtains with a content management computing device application configuration information about an executing application on an end user computing device that provides content to a primary end user. Sensor data is obtained with the content management computing device from one or more sensor devices. A type of device for the end user computing device executing the application is identified. One or more personalized values are determined with the content management computing device based on the obtained sensor data, the identified type of device, and the obtained application configuration information. The determined one or more personalized values are provided by the content management computing device to the end user computing device to optimize the content provided to the primary end user by the executing application.

27 Claims, 2 Drawing Sheets

SYSTEM USING PERSONALIZED VALUES TO OPTIMIZE CONTENT PROVIDED TO USER

This application claims the benefit of Indian Patent Application Filing No. 2637/CHE/2011, filed Aug. 1, 2011, which is hereby incorporated by reference in its entirety.

FIELD

This technology relates to methods for utilizing one or more obtained parameters, identified type of device executing an application, and obtained user profile data to generate one or more personalized values based on obtained application configuration data used by an executing application to optimize how content is provided and devices thereof.

BACKGROUND

Growing numbers of different types of devices, such as smartphones, internet protocol televisions, laptop computing devices, and desktop computing devices by way of example only, execute applications which provide content to end users. Unfortunately, most of those devices are configured to provide the content to the end user or users in a static format regardless of any environmental or other personalized parameters which may be impacting the presentation of that content. As a result, these devices often provide content to the end user or users in a less than optimal format.

SUMMARY

A method for optimizing how content is provided includes obtaining with a content management computing device application configuration information about an executing application on an end user computing device that provides content to a primary end user. Sensor data is obtained with the content management computing device from one or more sensor devices. A type of device for the end user computing device executing the application is identified with the content management computing device. Additionally, user profile data for the primary end user may optionally be obtained with the content management computing device. One or more personalized values are determined based on the obtained sensor data, an identified type of device, the optional user profile information, and the obtained application configuration information. The determined one or more personalized values are provided by the content management computing device to the end user computing device to optimize the content provided to the primary end user by the executing application.

A non-transitory computer readable medium having stored thereon instructions for optimizing how content is provided comprising machine executable code which when executed by at least one processor, causes the processor to perform steps including obtaining application configuration information about an executing application on an end user computing device that provides content to a primary end user. Sensor data is obtained from one or more sensor devices. A type of device for the end user computing device executing the application is identified. Additionally, user profile data for the primary end user may optionally be obtained. One or more personalized values are determined based on the obtained sensor data, an identified type of device, the optional user profile information, and the obtained application configuration information. The determined one or more personalized values are provided to the end user computing device to optimize the content provided to the primary end user by the executing application.

A content management computing device includes a memory coupled to the one or more processors which are configured to execute programmed instructions stored in the memory including obtaining application configuration information about an executing application on an end user computing device that provides content to a primary end user. Sensor data is obtained from one or more sensor devices. A type of device for the end user computing device executing the application is identified. Additionally, user profile data for the primary end user may optionally be obtained. One or more personalized values are determined based on the obtained sensor data, an identified type of device, the optional user profile information, and the obtained application configuration information. The determined one or more personalized values are provided to the end user computing device to optimize the content provided to the primary end user by the executing application.

This technology provides a number of advantages including providing methods and devices for utilizing one or more obtained parameters, identified type of device executing an application, and obtained user profile data to generate one or more personalized values based on obtained application configuration data used by an executing application to optimize how content is provided. With this technology, end users are provided content in an improved and more personalized manner. Additionally, the improved delivery of content to end users with this technology will result in experienced usage of devices coupled to this technology.

DETAILED DESCRIPTION

Figure 1:
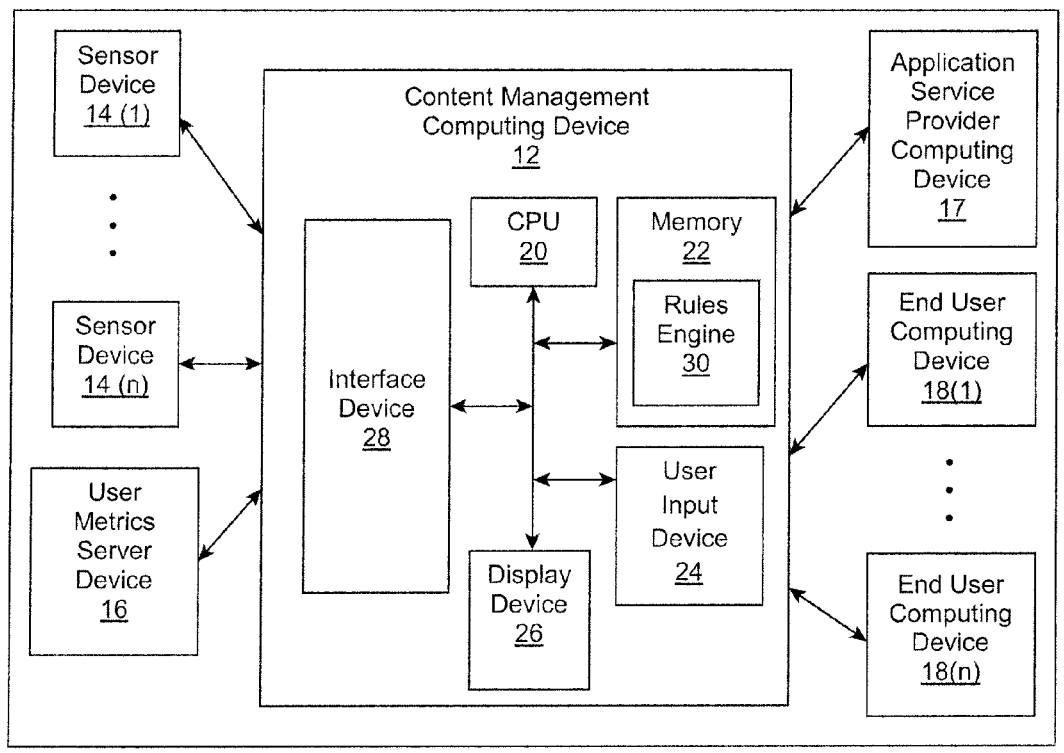
FIG. 1 is an environment with an exemplary content management computing device.

An environment 10 with an exemplary content management computing device 12 is illustrated in FIG. 1. The environment 10 includes the content management computing device 12, sensor devices 14(1)-14(n), a user metrics server device 16, an application service provider computing device 17 and end user computing devices 18(1)-18(n) which are all coupled together by one or more communication networks, although this environment can include other types and numbers of systems, devices, components, and elements in other configurations, such as multiple numbers of each of these apparatuses and devices. For example, the content management computing device 12 may contain the sensor devices 14(1)-14(n) to form a standalone hardware unit which is configured to allow an end user to enter and store user profile data in memory in the content management computing device 12 and otherwise configure the operation of the content management computing device 12 for interaction with one of the end user computing devices 18(1)-18(n). This technology provides a number of advantages including providing methods and device that utilize one or more obtained parameters, identified type of device executing an application, and obtained user profile data to generate one or more personalized values based on obtained application configuration data used by an executing application to optimize how content is provided.

The content management computing device 12 includes a central processing unit (CPU) or processor 20, a memory 22, a user input device 24, a display 26, and an interface device 28 which are coupled together by a bus or other link, although other numbers and types of systems, devices, components, and elements in other configurations and locations can be used. The processor 20 in the content management computing device 12 executes a program of stored instructions for one or more aspects of the present technology as described and illustrated by way of the examples herein, although other types and numbers of processing devices and logic could be used and the processor could execute other numbers and types of programmed instructions.

The memory 22 in the content management computing device 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 20, can be used for the memory 22. In this particular example, the memory 20 includes a rules engine module 30 with one or more programmed instructions for determining one or more personalized values for optimizing or otherwise modifying how content is provided in an executing application which are obtained from the application configuration data for the executing application which is obtained, although other types of rules could be implemented. This rules engine module 30 can be updated and modified to have different customized rules for determining personalized values for optimizing content in different application by an administrator or other user using the user input device 24 and display device 26.

The user input device 24 in the content management computing device 12 is used to input data and/or selections, although the user input device could be used to input other types of requests and data and interact with other elements. The user input device 24 can include keypads, touch screens, and/or vocal input processing systems although other types and numbers of user input devices can be used. The display 26 in the content management computing device 12 is a computer monitor, although other types and numbers of displays could be used.

The interface device 28 in the content management computing device 12 is used to operatively couple and communicate between the content management computing device 12 and sensor devices 14(1)-14(n), a user metrics server device 16, application service provider computing device 17, and end user computing devices 18(1)-18(n) via one or more of the communications networks, although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and SNMP, although other types and numbers of communication networks, such as a direct connection, a local area network, a wide area network, metropolitan area network, a personal area network, such as Bluetooth, modems and phone lines, e-mail, and wireless communication technology, each having their own communications protocols, can be used.

In this particular example, the sensor devices 14(1)-14(n) comprise an angle of inclination sensor device, a distance sensor device, a gesture sensor, a mood sensor device, a temperature sensor device, and an illumination sensor device, although other types and numbers of sensor devices could be used. The angle of inclination sensor device is a measurement device used to sense and determine the angle of inclination of the primary user and any secondary users with respect to the one of the end user computing devices 18(1)-18(n) executing the application, although other manners and devices for determining angle of inclination of a subject or other object could be used. The distance sensor device is a measurement device used to sense and determine the distance of the primary user and any secondary users from the one of the end user computing devices 18(1)-18(n) executing the application, although other manners and devices for determining distance of subject or other objects could be used. The gesture sensor device is a device that captures physical movements of the primary end user, such as the primary end users hands, and provides a quantified gesture output, although other manners for capturing and quantifying gestures could be used. The mood sensor device is a measurement device used to quantify a mood of the primary user based on sensed characteristics of the primary user, such as a captured facial recognition corresponding with a quantified mood, although other manners and devices for quantifying a mood of a subject could be used. The temperature sensor device is a measurement device used to sense and determine temperature in a region at or adjacent the one of the end user computing devices 18(1)-18(n) executing the application, although other types of environmental characteristics could be obtained. The illumination sensor device is a measurement device used to measure illumination about the one of the end user computing devices 18(1)-18(n) executing the application to determine a representative illumination model based on the measured illumination, although other types of illumination measurements could be determined and utilized.

The user metrics server device 16 includes a central processing unit (CPU) or processor, a memory, and an interface or I/O system, which are coupled together by a bus or other link, although the user metrics server device could comprise other numbers and types of devices, elements, and components in other configurations. The application service provider computing device 17 also includes a central processing unit (CPU) or processor, a memory, and an interface or I/O system, which are coupled together by a bus or other link, although the application service provider computing device could comprise other numbers and types of devices, elements, and components in other configurations or could be combined with the user metrics server device by way of example.

Each of the end user computing devices 18(1)-18(n) includes a central processing unit (CPU) or processor, a memory, a user input device, a display device, and an interface or I/O system, which are coupled together by a bus or other link, although the content provider server device could comprise other numbers and types of devices, elements, and components in other configurations. By way of example only, the content provider server device 18 could comprise a smartphone, internet protocol television, laptop computing device, desktop computing devices, or other computing device that executes an application which provides content to an end user or users.

Although examples of the content management computing device 12, sensor devices 14(1)-14(n), the user metrics server device 16, the application service provider computing device 17, and the end user computing devices 18(1)-18(n) coupled together via one or more communication networks are illustrated and described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
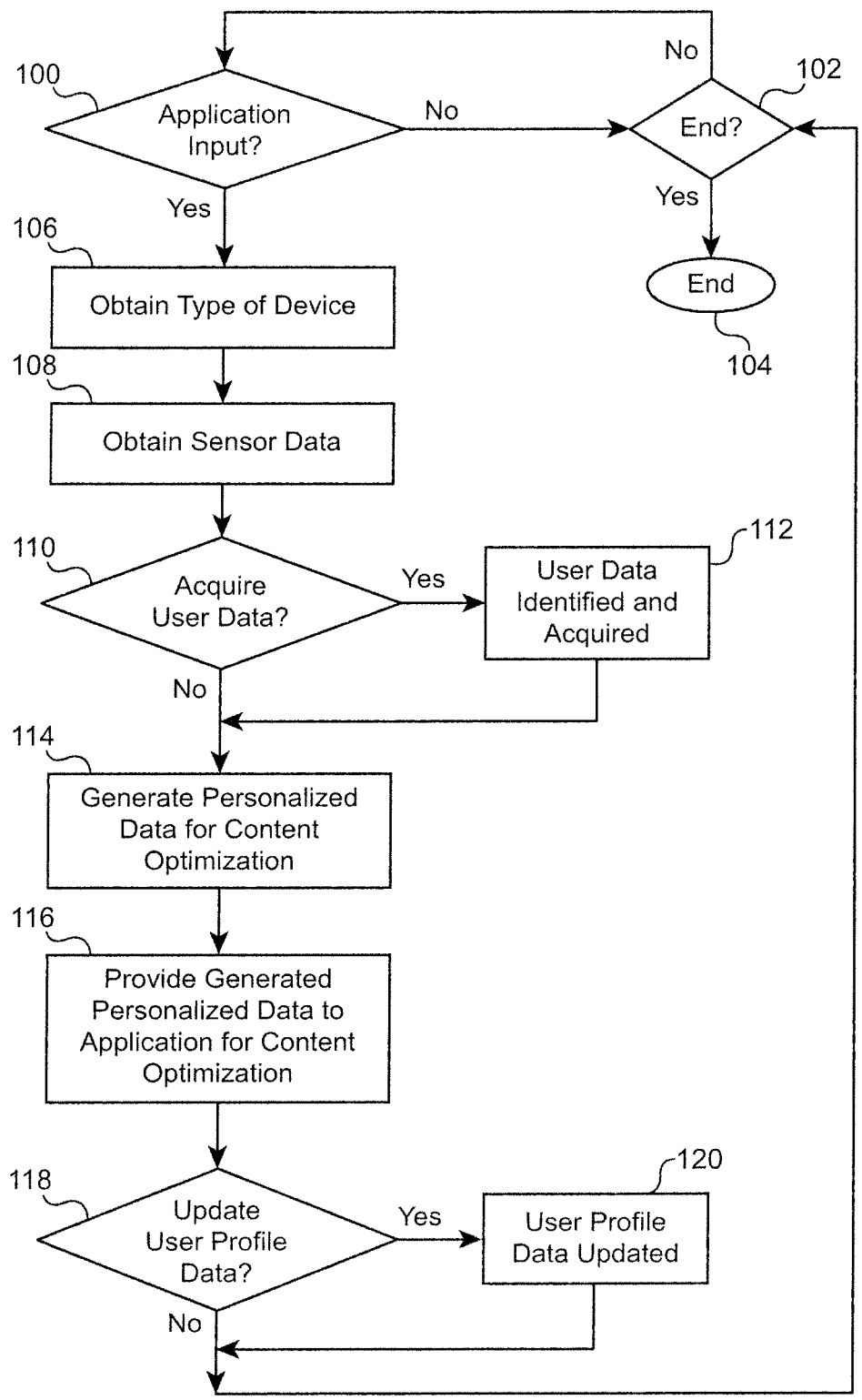
FIG. 2 is a flow chart of an exemplary method for optimizing how content is provided.

An exemplary method for utilizing one or more identified and obtained parameters and user profile data to generate one or more personalized values used by an executing application to optimize how content is provided will now be described with reference to FIGS. 1-2. In step 100, the content management computing device 12 determines whether application configuration data for an executing application on the one of the end user computing device 18(1)-18(n) has been received for the rules engine module 30. If in step 100, the content management computing device 12 determines application configuration data has not been received, then the No branch is taken to step 102.

In step 102, the content management computing device 12 determines whether to end this method. If in step 102, the content management computing device 12 determines to end this method, then the Yes branch is taken to step 104 where this method ends. If in step 102, the content management computing device 12 determines not to end this method, then the No branch is taken back to step 100 as described above.

If back in step 100, the content management computing device 12 determines application configuration data has been received, then the Yes branch is taken to step 106. In step 106, the content management computing device 12 obtains information which identifies the type of device the one of the end user computing devices 18(1)-18(n), such as an identifying serial number which is correlated against a table of stored serial numbers for different types of devices by way of example only.

In step 108, the content management computing device 12 obtains sensor data from one or more of the sensor devices 14(1)-14(n) based on the received application configuration data. By way of example only, the content management computing device 12 may obtain sensor data from one or more of the sensor devices 14(1)-14(n) on: an angle of inclination of a primary user and any secondary users with respect to the one of the end user computing device 18(1)-18(n) executing the application; a distance of a primary user and any secondary users from the one of the end user computing device 18(1)-18(n) executing the application; sensed facial characteristics of the primary user which can be correlated against stored characteristics associated with quantified moods in a table; quantified hand or other physical gestures of the primary user; a current temperature about the one of the end user computing device 18(1)-18(n) executing the application; and a current illumination from which a current illumination model could be determined.

In step 110, the content management computing device 12 determines whether to acquire user profile data about the primary user of the application executing on the one of the end user computing device 18(1)-18(n). If in step 108, the content management computing device 12 determines to acquire user profile data about the primary user, then the Yes branch is taken to step 112.

In step 112, the content management computing device 12 obtains user identification information from the one of the end user computing device 18(1)-18(n) executing the application for the primary user of the executing application (for example, from the obtained application configuration data), although the user identification information could be obtained from other sources. Additionally, the user profile data could be obtained by the content management device 12 in other manners, such as by input from a user into the content management computing device 12 by way of example only. Next, the content management computing device 12 utilizes the obtained user identification information to acquire user profile data associated with the primary user from the user metrics server device 16, although the user profile data could be obtained in other manners. For example, the user metrics server device 16 may have stored in memory data about the primary user, such as address, age, sex, and ethnicity by way of example only. Additionally, by way of example the user metrics server device 16 may also monitor and store data on the primary user's usage patterns, such as what types of websites and what portions of those websites does the primary user frequent, such as news, sports or entertainment.

If back in step 110, the content management computing device 12 determines not to acquire data about the primary user or can not identify the current primary user, then the No branch is taken to step 114. In step 112, the content management computing device 12 utilizes the obtained sensor data, the user profile data for the primary user if acquired, and one or more of the programmed rules based on the obtained application configuration information in the rules engine module 30 to generate one or more personalized values for optimizing the content provided by the application executing on the one of the end user computing device 18(1)-18(n), although other manners for generating one or more personalized values or other data and/or instructions which can be utilized by the executing application to optimize provided content could be used. By way of example only, based on the illumination of the environment adjacent the one of the end user computing devices 18(1)-18n), a personalized value is generated by the content management computing device 12 which specifies to the user to change the styling, such as font size, background color, contrast, and brightness, in the application so that primary user can view the content in a more optimized manner. The content management computing device 12 provides the determined one or more personalized values to the executing application in the one of the end user computing device 18(1)-18(n) to optimize the provided content. With this technology, the content management computing device 12 also can dynamically change these one or more determined personalized values or other data and/or instructions as data from the sensor devices 14(1)-14(n) and/or user metrics server device 16 changes in real time.

In step 118, the content management computing device 12 determines whether to update the user profile data stored on the user metrics server device 16. If in step 118, the content management computing device 12 decides to update the user profile data, then the Yes branch is taken to step 120 where the user profile data is updated and stored in user metrics server device 16, although the user profile data could be stored in other locations. If in step 118, the content management computing device 12 decides no update of the user profile data currently is needed, then the No branch is taken back to step 102 as described earlier.

Accordingly, as illustrated and described with the example herein this technology provides methods and devices for utilizing one or more identified and obtained parameters and user profile data to generate one or more personalized values used by an executing application to optimize how content is provided.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing how content is provided, the method comprising:
    obtaining with a content management computing device application configuration information about an executing application on an end user computing device that provides content to a primary end user;
    obtaining with the content management computing device sensor data from one or more sensor devices;
    identifying with the content management computing device a type of device for the end user computing device executing the application;
    determining with the content management computing device one or more personalized values based on the obtained sensor data, the identified type of device, and the obtained application configuration information; and
    providing with the content management computing device the determined one or more personalized values to the end user computing device to optimize the content provided to the primary end user by the executing application.

2. The method as set forth in claim 1 further comprising:
    obtaining with the content management computing device end user identification information associated with the primary end user at the content provider device with the executing application; and
    obtaining with the content management computing device user profile data based on the obtained end user identification, wherein the determining the one or more personalized values is further based on the obtained user profile data.

3. The method as set forth in claim 2 further comprising automatically updating with the content management computing device the user profile data based on determined one or more personalized values for the executing application on the end user computing device.

4. The method as set forth in claim 1 wherein the obtaining the sensor data from one or more sensor devices further comprises obtaining with the content management computing device an angle of inclination of the primary end user with respect to the end user computing device, a distance of the primary user from the end user computing device, one or more quantified gestures of the primary user, and a quantified mood of the primary user, wherein the determining the one or more personalized values is further based on the obtained angle of inclination, the obtained distance, the obtained one or more quantified gestures, and the obtained quantified mood of the primary user.

5. The method as set forth in claim 4 wherein the obtaining the sensor data from one or more sensor devices further comprises obtaining an angle of inclination of each of one or more secondary with respect to the end user computing device, wherein the determining the one or more personalized values is further based on the obtained angle of inclination of each of the one or more secondary users.

6. The method as set forth in claim 4 wherein the obtaining the sensor data from one or more sensor devices further comprises obtaining a distance of each of one or more secondary users from the end user computing device wherein the determining the one or more personalized values is further based on the obtained distance of each of the one or more secondary users.

7. The method as set forth in claim 1 wherein the obtaining the sensor data from one or more sensor devices further comprises obtaining one or more environmental characteristics adjacent the end user computing device, wherein the determining the one or more personalized values is further based on the obtained one or more environmental characteristics.

8. The method as set forth in claim 7 wherein the obtaining the one or more environmental characteristics about the end user computing device further comprises obtaining a current temperature, wherein the determining the one or more personalized values is further based on the obtained current temperature.

9. The method as set forth in claim 7 wherein the obtaining the one or more environmental characteristics about the end user computing device further comprises obtaining a current illumination model, wherein the determining the one or more personalized values is further based on the obtained current illumination model.

10. A non-transitory computer readable medium having stored thereon instructions for optimizing how content is provided comprising machine executable code which when executed by at least one processor, causes the processor to perform steps comprising:
    obtaining application configuration information about an executing application on an end user computing device that provides content to a primary end user;
    obtaining sensor data from one or more sensor devices;
    identifying a type of device for the end user computing device executing the application;
    determining one or more personalized values based on the obtained sensor data, the identified type of device, and the obtained application configuration information; and providing the determined one or more personalized values to the end user computing device to optimize the content provided to the primary end user by the executing application.

11. The medium as set forth in claim 10 further comprising:
obtaining end user identification information associated with the primary end user at the content provider device with the executing application; and
obtaining user profile data based on the obtained end user identification, wherein the determining the one or more personalized values is further based on the obtained user profile data.

12. The medium as set forth in claim 11 further comprising automatically updating the user profile data based on determined one or more personalized values for the executing application on the end user computing device.

13. The medium as set forth in claim 11 wherein the obtaining the sensor data from one or more sensor devices further comprises obtaining an angle of inclination of the primary end user with respect to the end user computing device, a distance of the primary user from the end user computing device, one or more quantified gestures of the primary user, and a quantified mood of the primary user, wherein the determining the one or more personalized values is further based on the obtained angle of inclination, the obtained distance, the obtained one or more quantified gestures and the obtained quantified mood of the primary user.

14. The medium as set forth in claim 13 wherein the obtaining the sensor data from one or more sensor devices further comprises obtaining an angle of inclination of each of one or more secondary with respect to the end user computing device, wherein the determining the one or more personalized values is further based on the obtained angle of inclination of each of the one or more secondary users.

15. The medium as set forth in claim 13 wherein the obtaining the sensor data from one or more sensor devices further comprises obtaining a distance of each of one or more secondary users from the end user computing device wherein the determining the one or more personalized values is further based on the obtained distance of each of the one or more secondary users.

16. The medium as set forth in claim 10 wherein the obtaining the sensor data from one or more sensor devices further comprises obtaining one or more environmental characteristics adjacent the end user computing device, wherein the determining the one or more personalized values is further based on the obtained one or more environmental characteristics.

17. The medium as set forth in claim 16 wherein the obtaining the one or more environmental characteristics about the end user computing device further comprises obtaining a current temperature, wherein the determining the one or more personalized values is further based on the obtained current temperature.

18. The medium as set forth in claim 16 wherein the obtaining the one or more environmental characteristics about the end user computing device further comprises obtaining a current illumination model, wherein the determining the one or more personalized values is further based on the obtained current illumination model.

19. A content management computing device comprising:
one or more processors;
a memory coupled to the one or more processors which are configured to execute programmed instructions stored in the memory comprising:
obtaining application configuration information about an executing application on an end user computing device that provides content to a primary end user;
obtaining sensor data from one or more sensor devices;
identifying a type of device for the end user computing device executing the application;
determining one or more personalized values based on the obtained sensor data, the identified type of device, and the obtained application configuration information; and
providing the determined one or more personalized values to the end user computing device to optimize the content provided to the primary end user by the executing application.

20. The device as set forth in claim 19 wherein the one or more processors is further configured to execute programmed instructions stored in the memory further comprising:
obtaining end user identification information associated with the primary end user at the content provider device with the executing application; and
obtaining user profile data based on the obtained end user identification, wherein the determining the one or more personalized values is further based on the obtained user profile data.

21. The device as set forth in claim 20 wherein the one or more processors is further configured to execute programmed instructions stored in the memory further comprising automatically updating the user profile data based on determined one or more personalized values for the executing application on the end user computing device.

22. The device as set forth in claim 20 wherein the one or more processors is further configured to execute programmed instructions stored in the memory for the obtaining the sensor data from one or more sensor devices further comprises obtaining an angle of inclination of the primary end user with respect to the end user computing device, a distance of the primary user from the end user computing device, one or more quantified gestures of the primary user, and a quantified mood of the primary user, wherein the determining the one or more personalized values is further based on the obtained angle of inclination, the obtained distance, the one or more obtained quantified gestures, and the obtained quantified mood of the primary user.

23. The device as set forth in claim 22 wherein the one or more processors is further configured to execute programmed instructions stored in the memory for the obtaining the sensor data from one or more sensor devices further comprises obtaining an angle of inclination of each of one or more secondary with respect to the end user computing device, wherein the determining the one or more personalized values is further based on the obtained angle of inclination of each of the one or more secondary users.

24. The device as set forth in claim 22 wherein the one or more processors is further configured to execute programmed instructions stored in the memory for the obtaining the sensor data from one or more sensor devices further comprises obtaining a distance of each of one or more secondary users from the end user computing device wherein the determining the one or more personalized values is further based on the obtained distance of each of the one or more secondary users.

25. The device as set forth in claim 19 wherein the one or more processors is further configured to execute programmed instructions stored in the memory for the obtaining the sensor data from one or more sensor devices further comprises obtaining one or more environmental characteristics adjacent the end user computing device, wherein the determining the one or more personalized values is further based on the obtained one or more environmental characteristics.

26. The device as set forth in claim 25 wherein the one or more processors is further configured to execute programmed instructions stored in the memory for the obtaining the one or more environmental characteristics about the end user computing device further comprises obtaining a current temperature, wherein the determining the one or more personalized values is further based on the obtained current temperature.

27. The device as set forth in claim 25 wherein the one or more processors is further configured to execute programmed instructions stored in the memory for the obtaining the one or more environmental characteristics about the end user computing device further comprises obtaining a current illumination model, wherein the determining the one or more personalized values is further based on the obtained current illumination model.

* * * * *